United States Patent [19]
Gabor
[11] 3,740,735
[45] June 19, 1973

[54] AIR CIRCULATION APPARATUS

[75] Inventor: Andrew Gabor, Danville, Calif.
[73] Assignee: Diablo Systems, Inc., Haywood, Calif.

[22] Filed: Sept. 14, 1970
[21] Appl. No.: 71,893

[52] U.S. Cl. ............. 340/174.1 E, 55/267, 55/338, 55/385, 55/467, 55/502, 415/53, 515/219 R
[51] Int. Cl. ......................... G11b 25/04, G11b 5/82
[58] Field of Search ..................... 55/385, 320, 338, 55/467, 267, 470–473, 502; 340/174.1 E; 415/53, 219 R

[56] References Cited

UNITED STATES PATENTS

| | | | |
|---|---|---|---|
| 1,883,288 | 10/1932 | Zubatz | 55/467 |
| 3,129,297 | 4/1964 | Schlichting | 340/174.1 E |
| 3,286,445 | 11/1966 | Welch | 55/467 |
| 3,303,485 | 2/1967 | Lee | 55/467 |
| 3,364,838 | 1/1968 | Bradley | 55/385 |
| 3,573,711 | 4/1971 | Cockrell, Jr. | 340/174.1 E |
| 3,624,624 | 11/1971 | Johnson | 55/385 |

*Primary Examiner*—Bernard Nozick
*Attorney*—Flehr, Hohbach, Test, Albritton and Herbert

[57] ABSTRACT

Air circulation apparatus, especially useful within magnetic disk memory units, recirculates a portion of the filtered air within the housing for the unit and disk drive to provide increased air velocity to dislodge dust particles from the disk unit and at the same time reduce the air flow requirements of the cleaning filter.

7 Claims, 3 Drawing Figures

INVENTOR.
ANDREW GABOR

BY
Flehr, Hohbach, Test, Albritton & Herbert
ATTORNEYS

AIR CIRCULATION APPARATUS

BACKGROUND OF THE INVENTION

The present invention is directed to an air circulation apparatus for a magnetic disk memory unit.

The driver unit for a magnetic disk memory unit normally includes an air circulation system which provides a flow of filtered cool air for both cleaning and cooling purposes. Air of sufficient velocity is necessary to dislodge dust particles from the disk unit which would otherwise cause damage to the memory surfaces of the disk unit during reading and writing. In addition, the disk unit must be maintained with a predetermined temperature range to limit dimensional changes.

Prior devices have merely introduced a flow of roughly filtered air into the disk drive cabinet, tapping off a portion of this flow through a higher grade filter and thence into the disk compartment or cartridge. In such systems reverse air flow, which occasionally occurs at the mouth of the cartridge especially when the higher grade filter becomes partially clogged, carries dust into the region of the recording head to disk interface, and may cause premature failure, or "head crashes."

OBJECTS AND SUMMARY OF THE INVENTION

It is a general object of the present invention to provide an improved air circulation apparatus for a magnetic disk memory unit.

It is another object of the invention to provide apparatus as above which requires a relatively low air velocity filter but still provide sufficient air velocity to dislodge dust particles.

It is another object of the invention to provide apparatus as above which also cools associated electrical components.

In accordance with the above objects there is provided an air circulation apparatus for a magnetic disk memory unit having air intake and exhaust ports. A housing having air intake and exhaust ports is provided for the memory unit. Centrifugal fan means are coupled to the air intake port of the housing and to the air intake port of the memory unit. The fan means includes a fan wheel and a scroll case having a gradually increasing outer radius. The scroll case has a central opening for the fan wheel and first and second port means. The first port means is at the larger end of the scroll case and coupled to the air intake port of the memory unit. The second port means is located in an intermediate position between the larger end and the smaller end of the scroll case and has a smaller aperture than the first port means to provide part of a closed loop path for the recirculation of air within the housing from the exhaust port of the memory unit.

Alternatively an orifice may be provided in the coupling between the air circulation means and the air intake of the housing to provide the recirculation.

BRIEF DESCRIPTION OF THE PREFERRED EMBODIMENTS

Figure 1:
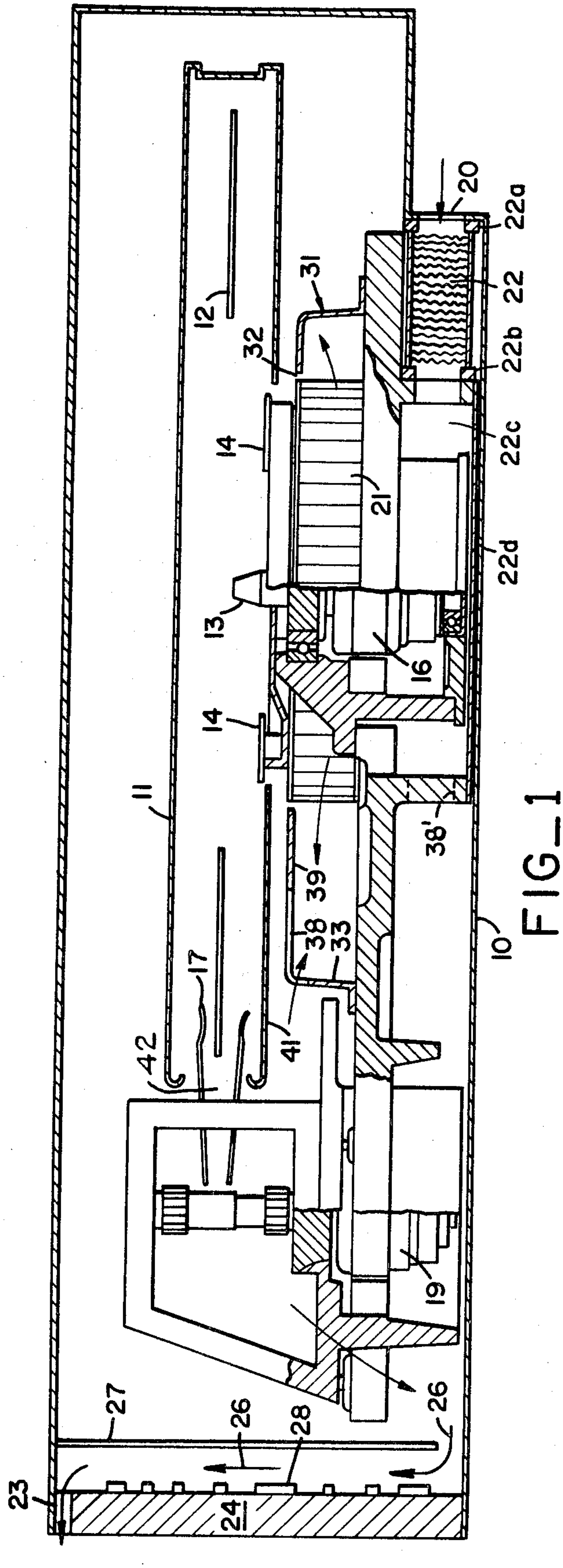
FIG. 1 is a cross sectional view partially cut away of apparatus embodying the present invention.

Referring first to FIG. 1, there is illustrated a housing 10 which contains a magnetic disk memory unit or cartridge 11. Such unit has one or more rotatable magnetic memory disks 12. In a manner well known in the art, the unit 11 is centered on a spindle 13 which has an annular flange 14 to which disks 12 are coupled for rotation. Driving the spindle or shaft 13 is a dc motor generally indicated at 16. Read/write heads 17 are positioned over disk 12 by means of a rack and pinion arrangement 18 which is coupled to a positioning servo motor 19. Details of the head positioning servo system are shown in a copending application filed in the name of Andrew Gabor, Ser. No. 23,569, filed Mar. 30, 1970 entitled "Apparatus for the Measurement of Relative Velocity Between Two Relatively Movable Members."

Also mounted on spindle or shaft 13 in addition to motor 16 is a blower impeller or fan wheel 21 which draws outside air through an air intake port 20 and through filter 22 to cleanse the disk cartridge and maintain a positive pressure within the housing and in addition to provide cooling air. Filter 22 is connected to air intake port 20 through a sponge rubber gasket **22*a* to ensure that all air entering filter 22 comes through port 20. Similarly, a gasket 22*b* seals the filter 22 at the point of air entry to plenum chamber 22*c* which is covered by cover plate 22*d*. This eliminates any dust particles which would otherwise interfere with the heads 17 and the disks 12.** The heads are normally spaced with a clearance smaller than a normal dust particle diameter.

Air exits housing 10 through an aperture 23 in the rear wall 24 of cabinet 10 as shown by the arrows 26. A narrow flow duct for the exiting air is formed between a baffle 27 and the back wall 24. Wall 24 also serves as a heat sink for several electronic components 28 which are mounted upon it. The narrow flow duct thus performs the dual purpose of providing an exit for air from the housing 10 and for cooling the electronic components used for controlling the disk drive unit and its head positioning servo system.

Incoming air through air intake port 20 all passes through filter 22 which is an absolute filter; it retains, for example, 99.97 percent of all particles over 0.3 microns in diameter.

During start up the spindle speed is temporarily increased to provide twice the normal air flow through the disk unit or cartridge 11 and as a result superior cleansing of the cartridge prior to head landing is accomplished. This is described and claimed in a copending application Ser. No. 53,532, filed July 9, 1970, in the name of Andrew Gabor entitled "Speed Control System Having High and Low Level Speed Means" and now U.S. Pat. No. 3,638,089.

Figure 2:
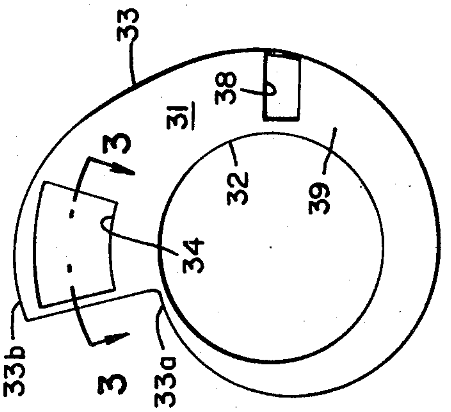
FIG. 2 is a plan view of a portion of FIG. 1.

Centrifugal fan means are provided by the fan wheel 21 in conjunction with a scroll case 31. As is true of most centrifugal fans the scroll case provides diffusion to increase the velocity of air to provide for an increased pressure in the system. As best shown in FIG. 2, the scroll case has an inner diameter 32 which is adapted for insertion of the fan wheel 21 and an outer diameter 33 which increases from its smallest radius or end **33*a* to its largest radius or end 33*b*. At this larger end is an aperture 34 which is coupled to an air intake port on disk unit 11.**

Figure 3:
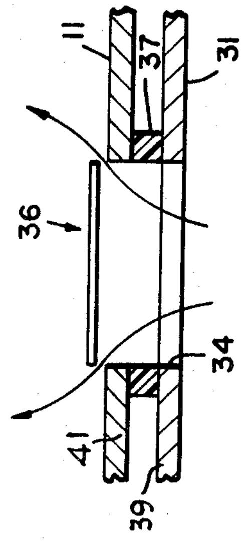
FIG. 3 is a cross-sectional view of a portion of FIG. 1 taken along line 3—3 of FIG. 2.

This is shown in greater detail in FIG. 3 where the disk unit 11 includes a port with mechanical closure unit 36 which allows air to enter the interior of the disk unit as illustrated. A sponge rubber gasket 37 provides for an air tight seal between scroll case 31 and disk unit 11. Such mechanical closures 36 are of standard design in magnetic disk memory units. The air entering through the closure 36 passes over the memory disk 12 and exits at the end 42 (FIG. 1) or mouth of the disk unit 11.

Still referring to FIG. 2, the scroll case includes a second port 38 intermediate the smaller end 33*a* and the larger end 33*b*. The size of this aperture as is apparent is significantly smaller than aperture 34. It is formed by a cutout in the top wall 39 of the scroll case which extends into the sidewall or outer radius 33.

As illustrated in FIG. 1, aperture 38 serves as part of the closed loop path for the recirculation of a portion of the air exiting at port 42 of the disk unit 11 to allow it to again enter the scroll case 31 to be recirculated through disk unit 11. The spacing of the top wall 39 from the bottom surface 41 of the disk unit allows sufficient air to re-enter the scroll case to provide for a significant amount of recirculation of the existing air in housing 10.

In fact, it has been found that only 30 percent of the air flow required to clean the disk unit of dust particles is required to pass through the filter unit 22 and the remaining 70 percent is provided by the recirculation capabilities described above. Thus, the recirculation provides a sufficient velocity of air flow to dislodge dust particles yet requires only a relatively low velocity filter 22 to therefore provide for more effective filtering. Moreover, the recirculated air is clean since the only air entering the housing is that allowed through filter 22.

Recirculation of air in accordance with the present invention may be accomplished by means of suitably placed apertures or orifices other than second port 38 in the scroll case. For example, an orifice 38' shown by dashed lines of correctly chosen size in one of the walls of plenum chamber 22*c* would accomplish the same controlled recirculation as the second port 38 shown in the scroll case.

Preferably, the head positioning unit 18 is of the type described in the above mentioned copending application since it has minimum cooling requirements. This requires less positive pressure in the housing 10 itself since pressure required for cleaning may be an order of magnitude lower than those pressures required for carrying away excess heat or cooling. In other words, the cleansing of the disk in the present invention dictates the minimum air flow and not the cooling requirements.

Thus, the present invention has provided an improved air circulation apparatus for a magnetic disk memory unit where a relatively low air velocity filter is used while still maintaining a sufficient air velocity by means of recirculation to dislodge dust particles from the associated disk unit. In addition, the exiting air is also used to cool associated electrical components.

I claim:

1. Air circulation apparatus for a self-contained and removable magnetic disk memory unit such unit having air intake and exhaust ports said apparatus comprising: a housing for said memory unit such housing having air intake and exhaust ports from and to ambient atmosphere respectively; and centrifugal fan means coupled to said air intake port of said housing and to said air intake port of said memory unit said fan means including a fan wheel and a scroll case having a gradually increasing outer radius such scroll case having a central opening for said fan wheel and first and second port means, said first port means being at the larger end of said scroll case and being coupled to said air intake port of said memory unit for supplying both cleaning and cooling air across the disk surface such air exiting said unit at said exhaust port of said memory unit, and said second port means being located in an intermediate position between said larger end and the smaller end of said scroll case and having a smaller aperture than said first port means to provide part of a closed loop path for the partial recirculation of air within said housing from said exhaust port of said memory unit.

2. Apparatus as in claim 1 where said scroll case includes top and side walls and said first port means includes an aperture in said top wall and said second port means includes an aperture formed by a cutout in said top wall extending into said sidewall.

3. Apparatus as in claim 1 where said top wall is parallel and spaced in close proximity to the bottom surface of said disk memory unit.

4. Apparatus as in claim 1 where said air intake port of said housing includes air filtering means.

5. Apparatus as in claim 1 together with a motor having a drive shaft coupled to said disk unit, said fan wheel also being mounted on said drive shaft.

6. Apparatus as in claim 1 where said exhaust port of said housing includes baffle means forming a narrow flow duct together with electrical components mounted within said duct.

7. Apparatus as in claim 6 where said components are mounted on a heat sink which forms a wall of said duct.

* * * * *